(12) United States Patent
Ricketts et al.

(10) Patent No.: US 12,501,862 B2
(45) Date of Patent: Dec. 23, 2025

(54) TRANSITIONAL AUGER STRIPPER

(71) Applicant: CNH Industrial America LLC, New Holland, PA (US)

(72) Inventors: Jonathan Ricketts, Coal Valley, IL (US); Brian P. Crow, Rock Island, IL (US)

(73) Assignee: CNH Industrial America LLC, New Holland, PA (US)

( * ) Notice: Subject to any disclaimer, the term of this patent is extended or adjusted under 35 U.S.C. 154(b) by 735 days.

(21) Appl. No.: 17/877,192

(22) Filed: Jul. 29, 2022

(65) Prior Publication Data

US 2024/0032472 A1 Feb. 1, 2024

(51) Int. Cl.
*A01D 63/02* (2006.01)
*A01D 45/02* (2006.01)

(52) U.S. Cl.
CPC ........... *A01D 63/02* (2013.01); *A01D 45/021* (2013.01)

(58) Field of Classification Search
CPC ........ A01D 63/00–63/04; A01D 65/00–65/08; A01D 45/00–45/30; A01D 57/30; A01D 63/02
See application file for complete search history.

(56) References Cited

U.S. PATENT DOCUMENTS

| | | | |
|---|---|---|---|
| 2,153,461 A | 4/1939 | Gooden | |
| 2,421,037 A * | 5/1947 | Ronning | A01D 61/008 56/364 |
| 3,118,265 A | 1/1964 | Shaver | |
| 3,508,387 A * | 4/1970 | Wright | A01D 41/14 56/95 |
| 3,807,152 A * | 4/1974 | Storm | A01D 45/021 56/98 |
| 4,137,695 A * | 2/1979 | Sammann | A01D 65/00 56/106 |
| 4,282,703 A * | 8/1981 | Wilson | A01F 12/10 460/70 |
| 4,346,548 A * | 8/1982 | Atkinson | A01D 45/021 56/119 |

(Continued)

FOREIGN PATENT DOCUMENTS

DE 609 504 2/1935
DE 622382 C * 11/1935

(Continued)

OTHER PUBLICATIONS

Extended European Search Report prepared for EP Application No. 23188384.4 dated Dec. 22, 2023 (5 pages).

*Primary Examiner* — Joseph M Rocca
*Assistant Examiner* — Madeline I Runco
(74) *Attorney, Agent, or Firm* — CM Law PLLC; Stephen J. Weed

(57) ABSTRACT

An agricultural harvester includes: a harvester frame; and an agricultural header coupled with the harvester frame, the agricultural header including: a header frame; an end row divider coupled with the header frame; an auger mounted to the end row divider and configured for moving a crop material rearwardly, the auger including a centerline; and an auger stripper coupled with the end row divider and configured for stripping the crop material from the auger, the auger stripper being angularly disposed relative to the centerline.

15 Claims, 7 Drawing Sheets

(56) References Cited

U.S. PATENT DOCUMENTS

| | | | | |
|---|---|---|---|---|
| 4,429,516 | A | * | 2/1984 | Erickson ................ A01D 57/22 56/95 |
| 5,588,494 | A | * | 12/1996 | Pickett ................... A01D 29/00 171/113 |
| 6,341,481 | B1 | * | 1/2002 | van der Merwe ... A01D 45/021 56/95 |
| 9,603,304 | B2 | * | 3/2017 | Lambertini .......... A01D 45/021 |
| 10,021,832 | B2 | * | 7/2018 | Wenger ................. A01D 65/00 |
| 10,159,186 | B2 | | 12/2018 | Berggren et al. |
| 10,897,846 | B2 | * | 1/2021 | Heims ................... A01D 65/04 |
| 10,932,412 | B2 | | 3/2021 | Richard et al. |
| 2012/0055134 | A1 | | 3/2012 | Lohrentz et al. |
| 2019/0110400 | A1 | | 4/2019 | Berggren et al. |

FOREIGN PATENT DOCUMENTS

| | | | |
|---|---|---|---|
| DE | 1041722 B | * 10/1958 | |
| EP | 1820385 A1 | 8/2007 | |
| EP | 2745668 A2 | 6/2014 | |
| WO | WO-2020194331 A1 | * 10/2020 | ............. A01D 45/10 |

* cited by examiner

TRANSITIONAL AUGER STRIPPER

FIELD OF THE INVENTION

The present invention pertains to an agricultural harvester, and, more specifically, to a combine header.

BACKGROUND OF THE INVENTION

An agricultural harvester known as a "combine" is historically termed such because it combines multiple harvesting functions with a single harvesting unit, such as picking, threshing, separating, and cleaning. A combine includes a header (which can also be referred to as a head) which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Headers of combines can be used to harvest various types of crop material, such as corn. Such headers can include a plurality of row units each of which receives a respective corn stalk. A respective row unit can include two gathering chains each including paddles, two deck plates which are spaced apart from one another to form a gap therebetween, and two rotating stalk rolls. The gap between the deck plates receives the corn stalk, and as the corn stalk is pulled down between the deck plates by the stalk rolls ears attached to the stalk can strike the deck plates and thereby be stripped from the stalk and be moved onward toward the interior of the combine by the paddles of the gathering chains. Positioned generally between these gaps are a plurality of row dividers spaced apart laterally across the front of the header. At each lateral end is a respective row divider, each of which can be called an end row divider, thus providing a left end row divider and a right end row divider. End row dividers serve to divide the crop material between the crop material that is to be harvested in the current pass from the crop material not to be harvested in the current pass. Mounted on each end row divider can be a respective auger extending substantially in a longitudinal direction of the header. Such augers are intended to move crop material rearwardly and inwardly. A problem exists, however, with such augers, namely, that of transporting laid over crop material rearwardly and the wrapping of crop material about the augers. To address such wrapping, auger strippers have been employed, to prevent such wrapping. For instance, a known auger stripper extends a full length of the auger and is placed in a location in line with an inside edge of a hood of the end row divider. This location, however, has been found to be a less than optimal location to strip the crop material from the auger, while also not optimally assisting in transport of the crop material away from a leading edge of the auger.

What is needed in the art is a way to improve the stripping of crop material from the auger and the transporting of the crop material away from the leading edge of the auger.

SUMMARY OF THE INVENTION

The present invention provides a transitional auger stripper of a corn header of a combine, the transitional auger stripper being angularly disposed relative to a centerline of the auger.

The invention in one form is directed to an agricultural harvester including: a harvester frame; and an agricultural header coupled with the harvester frame, the agricultural header including: a header frame; an end row divider coupled with the header frame; an auger mounted to the end row divider and configured for moving a crop material rearwardly, the auger including a centerline; and an auger stripper coupled with the end row divider and configured for stripping the crop material from the auger, the auger stripper being angularly disposed relative to the centerline.

The invention in another form is directed to an agricultural header of an agricultural harvester, the agricultural header being coupled with the harvester frame, the agricultural header including: a header frame; an end row divider coupled with the header frame; an auger mounted to the end row divider and configured for moving a crop material rearwardly, the auger including a centerline; and an auger stripper coupled with the end row divider and configured for stripping the crop material from the auger, the auger stripper being angularly disposed relative to the centerline.

The invention in yet another form is directed to a method of using an agricultural harvester, the method including the steps of: providing a harvester frame and an agricultural header coupled with the harvester frame, the agricultural header including a header frame, an end row divider coupled with the header frame, and an auger mounted to the end row divider and configured for moving a crop material rearwardly, the auger including a centerline; and stripping, by way of an auger stripper coupled with the end row divider, the crop material from the auger, the auger stripper being angularly disposed relative to the centerline.

An advantage of the present invention is that it provides improved stripping of the auger in a lead in area of the auger and thus fewer instances of wrapping of the auger.

Another advantage of the present invention is that it provides for better rearward transport of crop material from the leading edge of the auger.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG (Material Other than Grain), or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
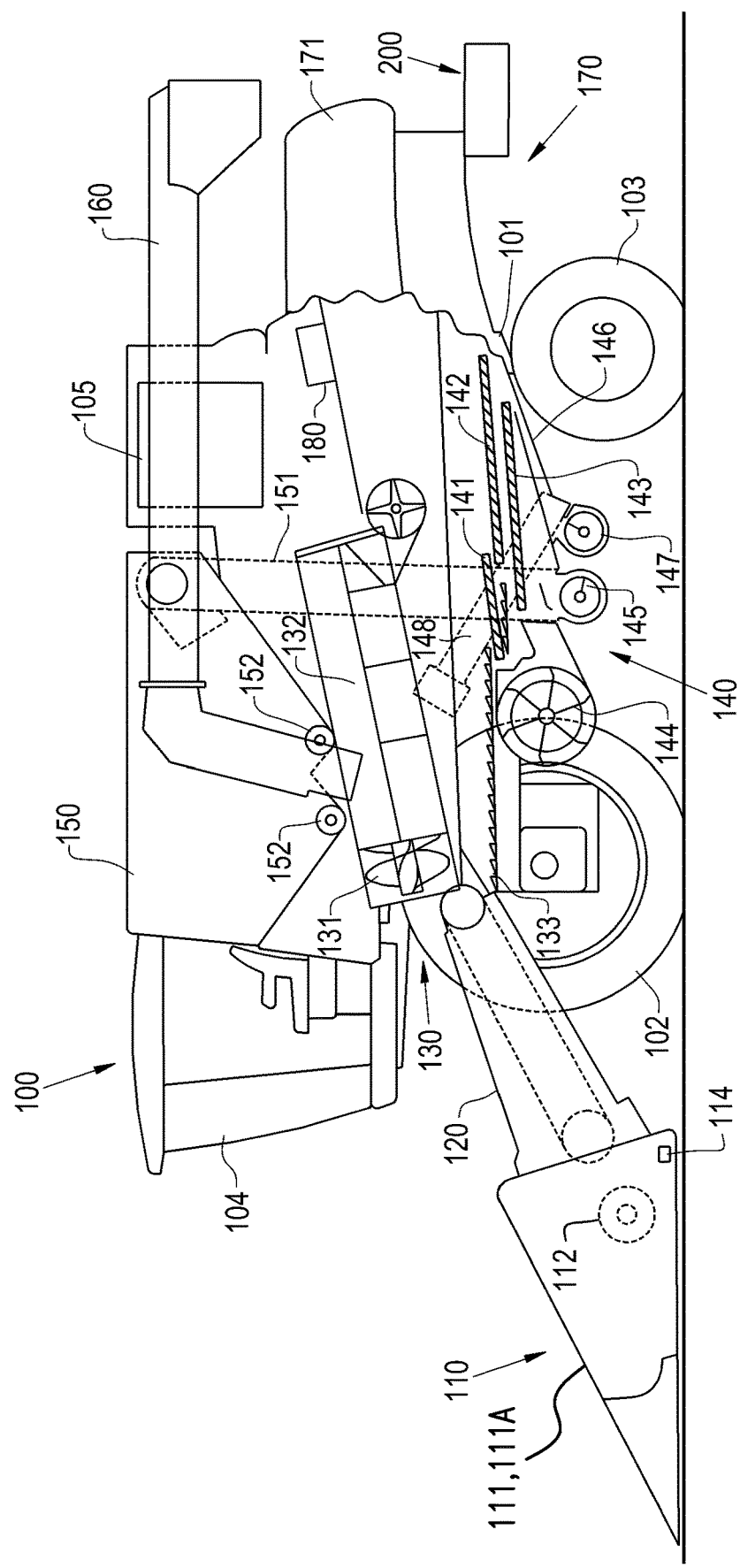
FIG. 1 illustrates a side view of an exemplary embodiment of an agricultural harvester, the agricultural harvester including a header assembly with a left end row divider, in accordance with an exemplary embodiment of the present invention.

Referring now to the drawings, and more particularly to FIG. 1, there is shown an embodiment of an agricultural harvester 100 in the form of a combine which generally includes a chassis 101 (which can be referred to as a harvester frame 101), ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 (which can be referred to as a head, a header assembly, or an agricultural header) is mounted to the front of combine 100 and, in this example, is a corn header 110 (which can also be referred to as a corn head or a corn header assembly). Header 110 is coupled with harvester frame 101. Header 110 includes a header frame 114 (shown schematically in FIG. 1), a plurality of row dividers 111 coupled with header frame 114 and spaced apart across the front of header 110 (the left-most row divider 111 being shown in FIG. 1, the left- and right-most row dividers 111 also being referred to as end row dividers 111A, 111B, respectively, and being at the lateral ends of header 110), and a plurality of row units 206 (FIG. 2) coupled with the header frame 114, each row unit 206 being generally operatively positioned between two respective dividers 111. Row dividers 111 serve to divide the crop material between the crop material that is to be harvested in the current pass from the crop material not to be harvested in the current pass. Row units 206 separate the ear of corn from respective stalks in a field during forward motion of combine 100 and move the ears to an auger 112, such as a double auger 112 (disposed transversely across header 110), which feeds the severed crop (here, an ear of corn) laterally inwardly from each side toward feeder housing 120 (it can be appreciated that other types of conveyors can be used besides double auger 112, such as a draper header). Feeder housing 120 conveys the severed crop to threshing and separating system 130, and is selectively vertically movable using appropriate actuators, such as hydraulic cylinders (not shown). The header of the present invention can be flexible, rigid, and/or articulating. For illustrative purposes, omitted in FIG. 1 is auger 207, but it is understood that an auger 207 is mounted to end row divider 111A.

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
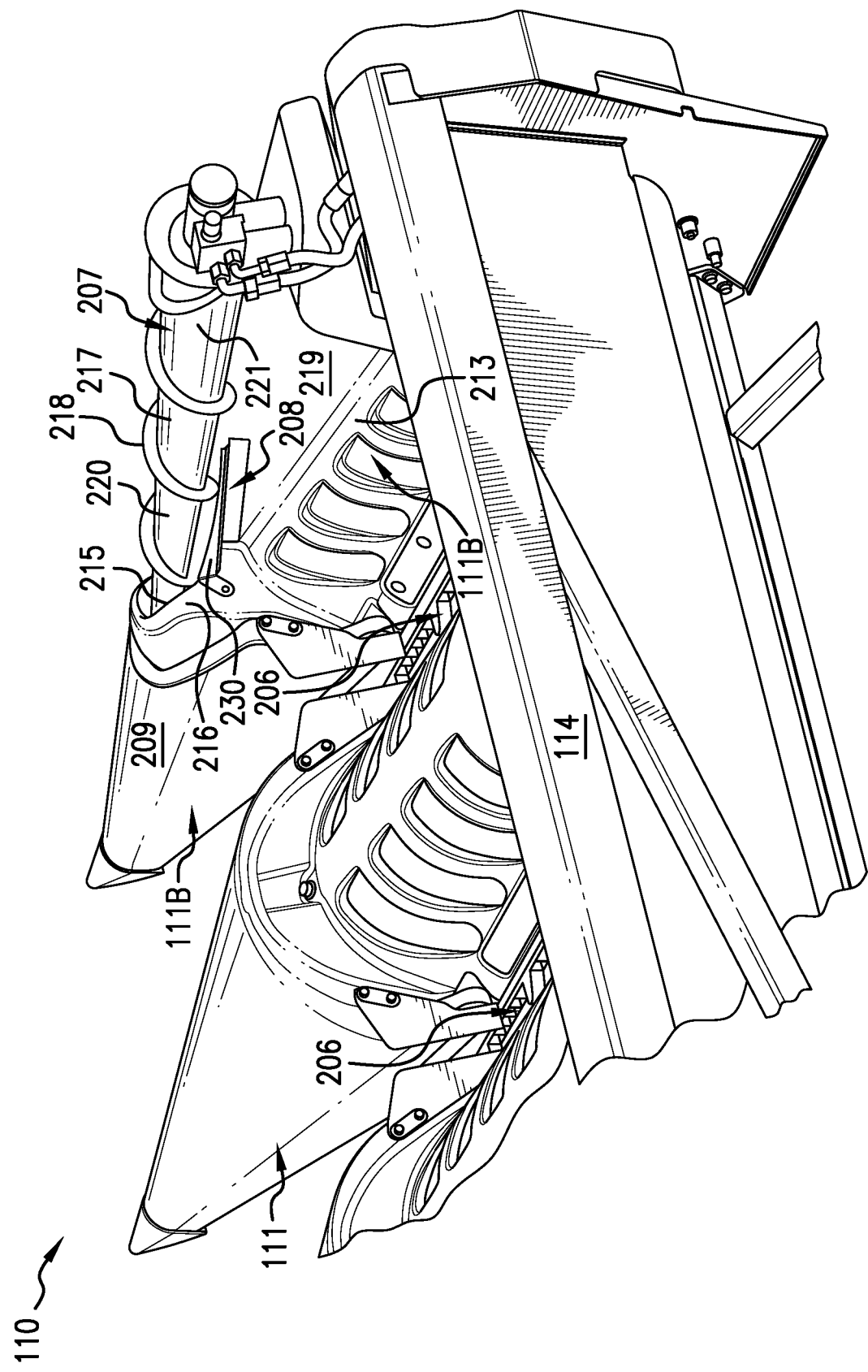
FIG. 2 illustrates a perspective view of the header assembly of FIG. 1, with portions broken away, the header assembly including a right end row divider, an auger, and an auger stripper, in accordance with an exemplary embodiment of the present invention.

Referring now to FIG. 2, there is shown a perspective view of header 110, with portions broken away. Header 110 includes row dividers 111, with a right end row divider 111B and an adjacent row divider 111 positioned laterally inward of end row divider 111B. End row dividers 111A, 111B are substantially identical to one another except that one mirrors the other; with this in mind, a description of one serves as a description of the other, except where mirroring occurs in view of each being positioned at a respective lateral end of header 110. Header 110 further includes row units 206 (which are known and will not be described in further detail), an auger 207 (which can be referred to as a side auger or an end row divider auger), and an auger stripper 208. End row divider 111B includes a snout 209 and a body 213 coupled therewith and positioned rearwardly thereof, as is known. End row divider 111B further includes a pocket 215, in which a front portion of side auger 207 is positioned. Snout 209 includes a rear wall 216 which slopes downward. Side auger 207 includes a shaft 217 and fighting 218 coupled with shaft 217. A respective side auger 207 is mounted on a respective end row divider 111A, 111B (thus forming left and right side augers 207), such that a description of one serves as a description of the other, though left and right side augers 207 can mirror one another; for instance, while right side auger 207 (shown in FIG. 2) rotates counter-clockwise (viewed from cab 104 and thus looking generally right-to-left (forward) down side auger 207 shown in FIG. 2) in order to move the crop material rearwardly and inwardly, left side auger 207 rotates clockwise. Auger 207 extends substantially in a longitudinal direction of header 110. Auger 207 thus is configured for moving the crop material (i.e., corn) rearwardly and inwardly. Auger includes a front end 220 and a rear end 221.

Auger stripper 208 is coupled with end row divider 111B. Like side augers 207, a respective auger stripper 208 is mounted to a respective end row divider 111A, 111B (thus forming left and right auger strippers 208), such that a description of one serves as a description of the other, though left and right auger strippers 208 can mirror one another (the right auger stripper 208 being shown in FIG. 2). Auger stripper 208 is attached by way of fasteners to a side sheet 219 of body 213 (more specifically, to side sheet 219 of an end row divider hood of body 213) and also to rear wall 216; the fasteners can be any suitable fasteners (by way of example and not limitation, hexagonal-head screws or bolts) configured for attaching to end row divider 111B, which can include a plastic material to which the fasteners attach. As shown in FIG. 2, stripper 208 is attached to an inboard side of end row divider 111B. Stripper 208 is configured for stripping the crop material from auger 207 by way of stripping segment 230, which generally stands upright and includes a free edge 435 (FIG. 4) which performs the stripping of the crop material from auger 207. Stripper 208 is associated with front end 220 of auger 207 but not rear end 221 of auger 207; front end 220 can include approximately the front half or the front 60 percent of auger 207.

Figure 3:
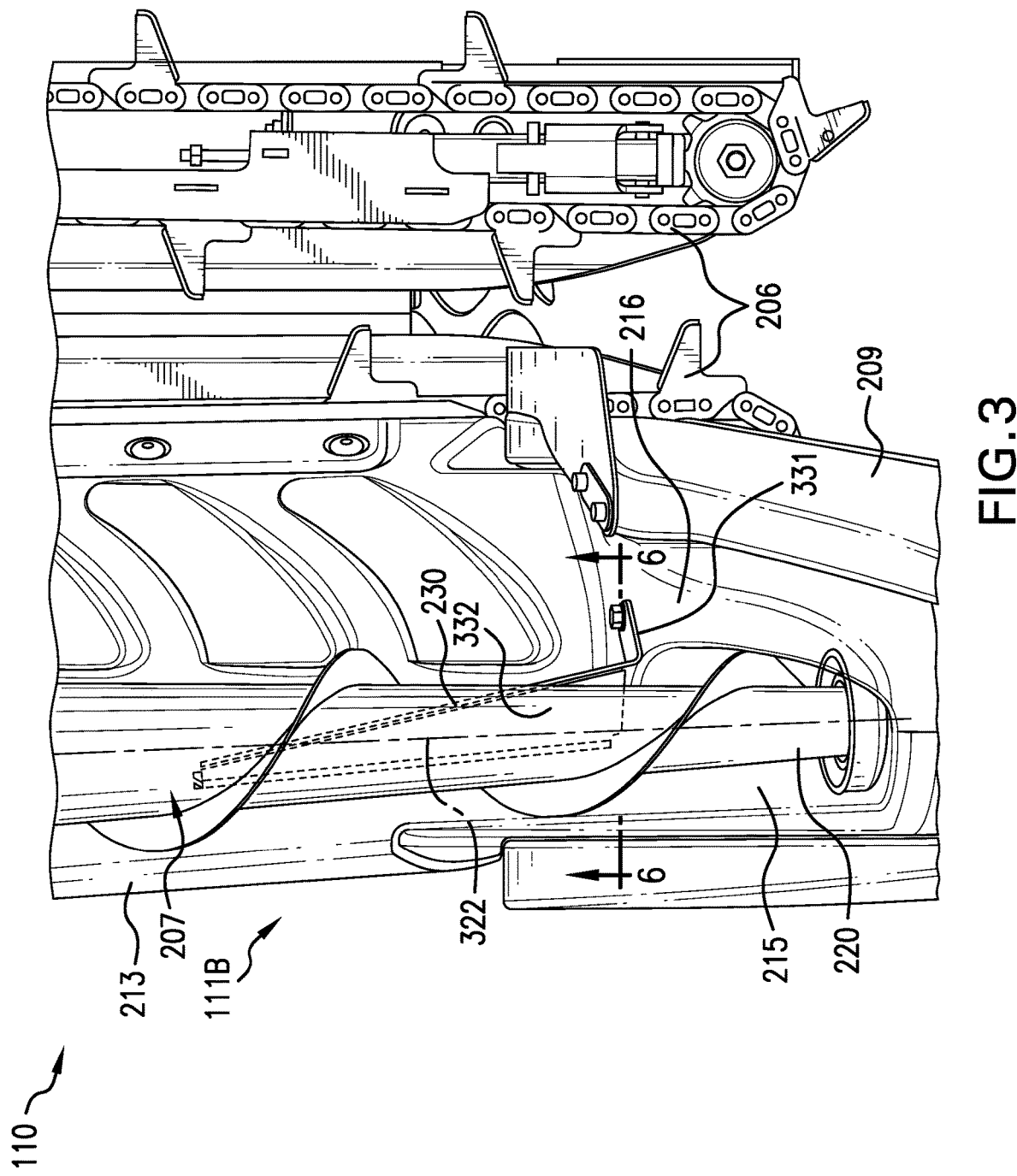
FIG. 3 illustrates a top view of the header assembly of FIG. 1, with portions broken away, in accordance with an exemplary embodiment of the present invention.

Referring now to FIG. 3, there is shown a top view of header 110, with portions broken away. A portion of auger 207 is shown, including front end 220. Auger 207 is shown to have a centerline 322, which also is a rotational axis of auger 207. The portion of stripper 208 shown in broken lines in FIG. 3 is generally blocked from view by way of the top view and is thus at least somewhat under auger 207. Stripper 208 is shown to include stripping segment 230, connecting flange 331, and intermediate segment 332, all coupled to one another. Stripping segment 230 (which is described even further below) is angularly disposed relative to centerline 322, as shown in FIG. 3. That is, free edge 435 of stripping segment 230 (facing the viewer of FIG. 3) makes a predetermined acute angle with centerline 322 (and thus also a predetermined acute angle with side sheet 246219, which may or may not be the same as the angle made with centerline 322); this angle likely provides a more optimal relation to auger 207. Because of this angular disposition and enabled by a curvature 736 (which can be referred to as a curved portion 736, a concavity 736) (FIG. 7) of free edge 435 of stripping segment 230 (visible in FIGS. 2, 4, 5, and 7), proceeding front a front end of free edge 435 to a rear end of free edge 435, free edge 435 proceeds under auger 207, as best seen in FIGS. 2 and 3. In this way, stripper 208 performs an improved stripping action and movement rearward of the crop material relative to auger 207. Connecting flange 331, which is connected to stripping segment 230, is connected to rear wall 216 by way of a suitable fastener. Intermediate segment 332, which is also connected to stripping segment 230, includes a top surface that faces generally upward toward auger 207 and an opposing bottom surface that faces toward end row divider 111B.

Figure 4:
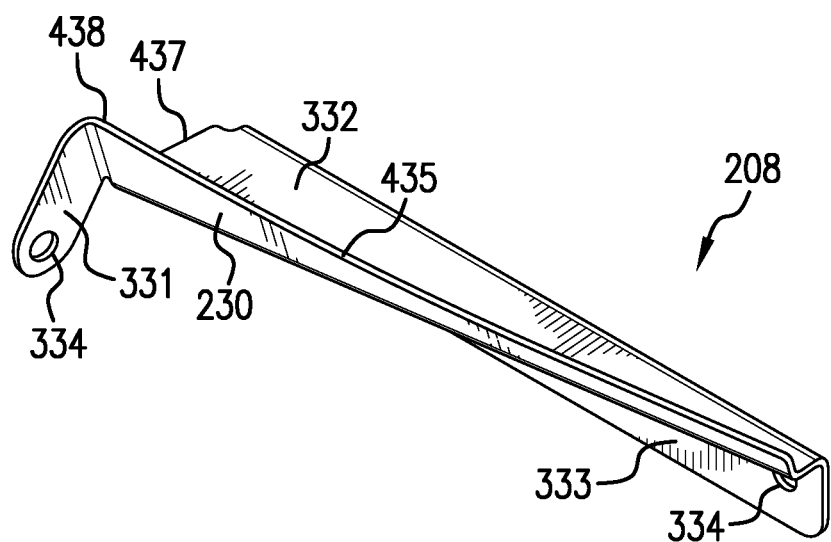
FIG. 4 illustrates a perspective view of the auger stripper of FIG. 2, in accordance with an exemplary embodiment of the present invention.

Referring now to FIG. 4, there is shown a perspective view of auger stripper 208. Stripper 208 can be made of any suitable material, such as a metal (for example, stainless steel, or aluminum) or a polymer (it is assumed herein that stripper 208 is made of stainless steel). Stripper 208 includes intermediate segment 332, connecting segment 333, stripping segment 230, and connecting flange 331. Intermediate segment 332 is a generally horizontal segment when stripper 208 is attached to end row divider 111 and connects stripping segment 230 and connecting segment 333 together. A width of intermediate segment 332 at a front end of stripper 208 (the left side of stripper 208 in FIG. 4) is greater than a width of intermediate segment 332 at a rear end of stripper 208 (the right side of stripper 208 in FIG. 4), the width of intermediate segment 332 thus tapering, such that when stripper 208 is attached to end row divider 111B stripper 208 tapers toward auger 207 and thus also into side sheet 216 (as also shown in FIGS. 2 and 3). Connecting segment 333 depends from intermediate segment 332 and serves to connect stripper 208 to side sheet 219 by way of suitable fasteners using fastener holes 334 (as shown in FIG. 2, connecting segment 333 can include two such holes 334 (though more or less may be used). Further, stripping segment 230 is connected to and upstanding relative to intermediate segment 332. Stripping segment 230 includes free edge 435, which descends in height relative to intermediate segment 332 as free edge 435 progresses from the front end of stripper 208 to the rear end of stripper 208. Free edge 435 includes curvature 736 (best seen in FIG. 7), which is concave. Free edge 435 is concave so that free edge 435 can follow closely and constantly the outer diameter of flighting 218 as shaft 217 of auger 207 rotates. Connecting flange 331 extends from a front end of stripping segment 230. Connecting flange 331 also includes a fastener hole 334 for receiving therethrough a suitable fastener for attaching connecting flange 331 to rear wall 216. Connecting flange 331 makes any suitable angle with stripping segment 230 so that connecting flange 331 connects with rear wall 216, for example, 110 degrees (+/−10 degrees), which positions connecting flange 331 in line or parallel with a front edge 437 of intermediate segment 332. Auger stripper 208 further includes a leading edge portion 438 of free edge 435. Leading edge portion 438 cooperates with rear wall 216 for improved stripping of the crop material from auger 207. That is, rear wall 216 can begin to strip crop material from auger 207. But as soon as rear wall 216 encounters stripper 208, stripper 208 performs the stripping action. Leading edge portion 438, together with the specific curvature/ concavity (736) of free edge 435 and the descending height of stripping segment 230 moving rearwardly, provides for a smooth transition from a slope of rear wall 216 (which can be said to form a first angle with a horizontal line) to a slope of stripping segment 230 formed by curvature/concavity 736 running from leading edge portion 438 (which can be said to form a second angle with a horizontal line, wherein the second angle can be substantially identical to the first angle, or within a predetermined degree of difference so as to provide for a gradual or smooth transition from rear wall 216 to free edge 435), which thus provides for continuous stripping of crop material from auger 207 extending rearwardly and thus beyond pocket 215.

Figure 5:
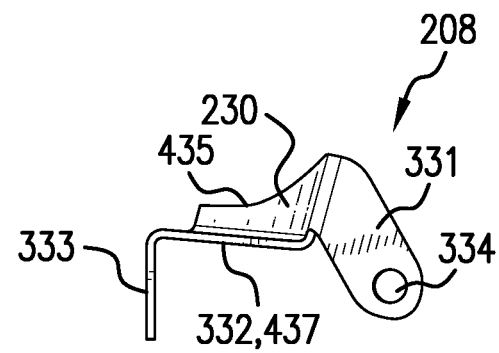
FIG. 5 illustrates a front view of the auger stripper of FIG. 2, in accordance with an exemplary embodiment of the present invention.

Referring now to FIG. 5, there is shown a front view of auger stripper 208. Shown are front edge 437 of intermediate segment 332, connecting segment 333, connecting flange 331, and stripping segment 230. Further, stripping segment 230 is shown to include free edge 435, which forms a curvature/concavity (which is labeled 736 in FIG. 7). The angles between intermediate segment 332 and connecting segment 333 and between intermediate segment 332 and stripping segment 230 can, depending upon the needs for attaching stripper 208 to end row divider 111, each be 90 degrees, less than 90 degrees, or greater than 90 degrees; FIG. 5 shows that the former angle is less than 90 degrees, and the latter angle is greater than 90 degrees. Further, FIG. 5 shows that auger stripper 208 can include a substantially Z-shaped configuration with respect to connecting segment 333, intermediate segment 332, and stripping segment 230.

Figure 6:
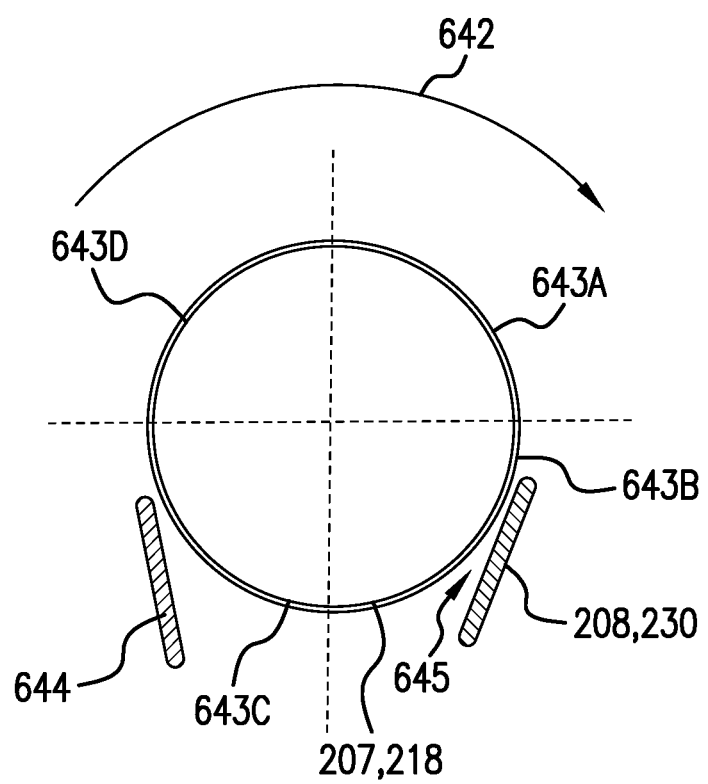
FIG. 6 illustrates schematically a front, cross-sectional view of the auger and the auger stripper, taken approximately along line 6-6 in FIG. 3, with portions broken away, in accordance with an exemplary embodiment of the present invention.

Referring now to FIG. 6, there is shown schematically a front, cross-sectional view of auger 207 and auger stripper 208, taken approximately along line 6-6 in FIG. 3, with portions broken away. Auger 207 is shown schematically, in that only the outer diameter of fighting 218 is shown. Further, because auger 207 is here a right side auger 207 and the view is taken looking front to rear, auger 207 is shown to rotate clockwise by way of directional arrow 642. Further, auger stripper 208 is shown schematically, in that only stripping segment 230 is shown. A reference grid 643 is also provided in broken lines, reference grid 643 having a vertical line and a horizontal line. Reference grid 643 delineates four quadrants on the outer diameter of fighting 218, namely, 643A, 643B, 643C, and 643D, proceeding clockwise. FIG. 6 shows that, when auger 207 begins to encounter stripper 208 (that is, stripper 208 comes alongside auger 207) as shown in FIG. 6, stripping segment is located in quadrant 643B. Thus, the stripping action advantageously begins on an inboard side of auger 207 and thus on a down-swing of rotation of auger 206, because of directional arrow 642. Further, though close, stripper 208 need not actually make contact with auger 207; in this vein, free edge 435 (and thus curvature/concavity 736, which can also be referred to as a curved portion 736 of stripping segment 230) is configured to form a constant clearance with the outer diameter of flighting 216 when auger 207 rotates and enables stripper 208 to pass under auger 207. For purposes of contrast, FIG. 6 also shows a prior art stripper 644 (shown in broken lines), though it can be appreciated that both strippers 208 and 644 are not used on the same end row divider 111. FIG. 6 shows when auger 207 begins to encounter stripper 644, which occurs in quadrant 643C, at which point the crop material, disadvantageously, has already begun wrapping about auger 207, as auger 207 is on an up-swing of rotation.

Further, auger stripper 208 is "transitional." That is, stripper 208 provides the stripping capability immediately after (rearward) pocket 215 in a plastic hood of end row divider 111B. Further, stripper 208, as described above, shifts from this location—that is, an inboard side of auger 207, based on centerline 322—to an outboard side of auger 207 over a length of stripper 208, which can be about one foot long, for example and not limitation. Upon reaching its terminating longitudinal extent (rearward), stripper 208 has transitioned to nothing (that is, stripper 208 has terminated) for a remaining length of auger 207. During testing, it was found that nearly all wrapping of crop material about auger 207 occurred at a front end 220 of auger 207, or, more specifically, from the leading edge of auger 207 to approximately one-third of an initial length of auger 207 (starting from the leading edge of auger 207). Further, curvature/concavity 736 of free edge 435 of stripper 208 is provided because of the transition of stripper 208 from the inboard side of auger 207 to the outboard side of auger 207 over the length of stripper 208. Further, in view of curvature/concavity 736, stripper 208 is cut to allow for clearance 645 as stripper 208 passes under auger 207 to side sheet 216. This provides for good stripping action with respect to crop material that may begin to wrap auger 207, and also provides good crop material transport away from the leading edge of auger 207.

Figure 7:
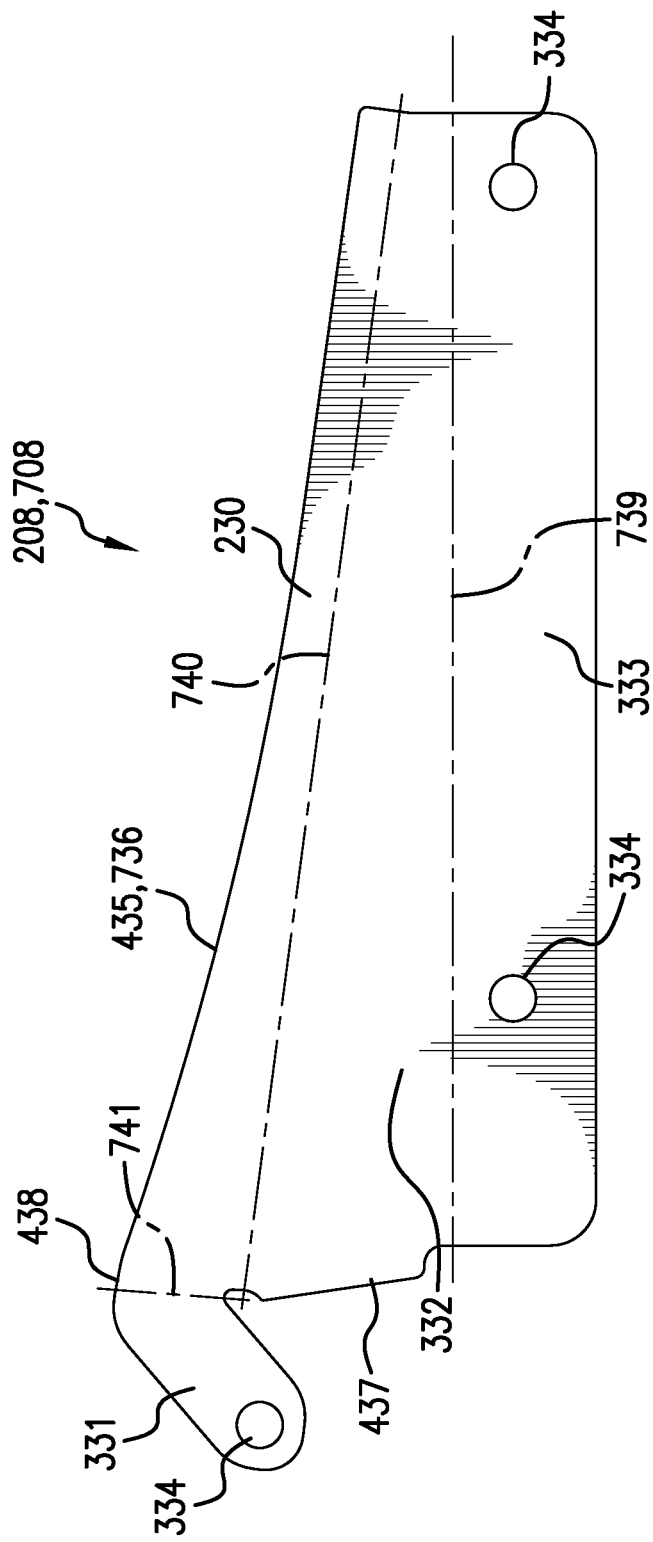
FIG. 7 illustrates a side view of a blank used to form the auger stripper of FIG. 2, in accordance with an exemplary embodiment of the present invention.

Referring now to FIG. 7, there is shown a side view of a metal blank 708, which is to be bent or folded so as to form auger stripper 208. Blank 708 includes intermediate segment 332 (with front edge 437), connecting segment 333, stripping segment 230, connecting flange 331, fastener holes 334, free edge 435 which defines curvature/concavity 736, and leading edge portion of free edge 435. Further, during manufacture of stripper 208, stripper 208 can be formed by way of a stamping operation. Blank 708 can be cut from a larger piece of metal, in the shape shown in FIG. 7. Blank 708 is flat at this stage. Then, blank 708 can be formed into stripper 208 by way of bending or folding along fold lines 739, 740, 741, into the shape shown in FIG. 4, for example.

In use, stripper 208 is manufactured using a stamping process as described above. Stripper 208 is attached to a respective end row divider 111 (for example, end row divider 111B) using fasteners and holes 334. As an operator of combine 100 harvests corn through a field, end row divider 111B encounters stalks of corn, which may encounter auger 207. Auger 207, by way of its rotation, moves the crop material rearwardly and inwardly. In so doing, the rotation of auger 207 can tend to cause crop material to wrap around auger 207, which can be particularly exacerbated in weedy, damp, and/or early season harvesting conditions. However, because of the location and design of stripper 208, crop material is prevented from (at least substantially so) from wrapping around auger 207, because stripper 208 strips crop material from auger 207, and is helped in being transported away from the leading edge of auger 207.

Figure 8:
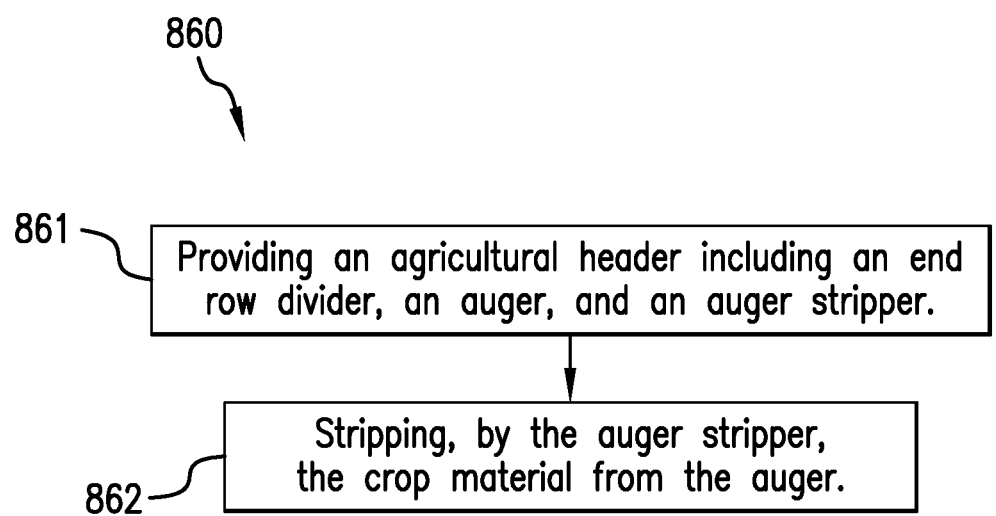
FIG. 8 illustrates a flow diagram showing a method of using an agricultural harvester, in accordance with an exemplary embodiment of the present invention.

Referring now to FIG. 8, there is shown a flow diagram of a method 860 of using an agricultural harvester 100, the method 860 including the steps of: providing 861 that the agricultural harvester 100 includes a harvester frame 101 and an agricultural header 110 coupled with the harvester frame 101, the agricultural header 110 including a header frame 114, an end row divider 111, 111A, 111B coupled with the header frame 114, and an auger 207 mounted to the end row divider 111, 111A, 111B and configured for moving a crop material rearwardly, the auger 207 including a centerline 322; and stripping 862, by way of an auger stripper 208 coupled with the end row divider 111, 111A, 111B, the crop material from the auger 207, the auger stripper 208 being angularly disposed relative to the centerline 322. The auger 207 includes a front end 220 and a rear end 221, the auger stripper 208 being associated with the front end 220 but not the rear end 221. The auger 207 includes fighting 218, the auger stripper 208 including a curved portion 736 configured to form a constant clearance 645 with the fighting 218 when the auger 207 rotates. The auger stripper 208 includes a leading edge portion 438 that cooperates with the end row divider 111, 111A, 111B for stripping the crop material. The auger stripper 208 includes a substantially Z-shaped configuration.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvester, comprising:
   a harvester frame; and
   an agricultural header coupled with the harvester frame, the agricultural header including:
   a header frame;
   an end row divider coupled with the header frame, the end row divider having an inboard side and an outboard side;
   an auger mounted to the end row divider and configured for moving a crop material rearwardly, the auger having a centerline, a front end, and a rear end; and
   an auger stripper coupled with the end row divider and configured for stripping the crop material from the auger, the auger stripper being angularly disposed relative to the centerline and extending below the auger from the inboard side of the end row divider adjacent the front end to the outboard side of the end row divider.

2. The agricultural harvester of claim 1, the auger stripper being associated with the front end but not the rear end.

3. The agricultural harvester of claim 2, wherein the auger includes flighting, the auger stripper including a curved portion configured to form a constant clearance with the flighting when the auger rotates.

4. The agricultural harvester of claim 3, wherein the auger stripper includes a leading edge portion that cooperates with the end row divider for stripping the crop material.

5. The agricultural harvester of claim 4, wherein the auger stripper includes a substantially Z-shaped configuration.

6. An agricultural header of an agricultural harvester, the agricultural harvester including a harvester frame, the agricultural header being coupled with the harvester frame, the agricultural header comprising:
   a header frame;
   an end row divider coupled with the header frame, the end row divider having an inboard side and an outboard side;
   an auger mounted to the end row divider and configured for moving a crop material rearwardly, the auger having a centerline, a front end, and a rear end; and
   an auger stripper coupled with the end row divider and configured for stripping the crop material from the auger, the auger stripper being angularly disposed relative to the centerline and extending below the auger from the inboard side of the end row divider adjacent the front end to the outboard side of the end row divider.

7. The agricultural header of claim 6, the auger stripper being associated with the front end but not the rear end.

8. The agricultural header of claim 7, wherein the auger includes flighting, the auger stripper including a curved portion configured to form a constant clearance with the flighting when the auger rotates.

9. The agricultural header of claim 8, wherein the auger stripper includes a leading edge portion that cooperates with the end row divider for stripping the crop material.

10. The agricultural header of claim 9, wherein the auger stripper includes a substantially Z-shaped configuration.

11. A method of using an agricultural harvester, the method comprising the steps of:
providing that the agricultural harvester includes a harvester frame and an agricultural header coupled with the harvester frame, the agricultural header including a header frame, an end row divider coupled with the header frame, the end row divider having an inboard side and an outboard side, and an auger mounted to the end row divider and configured for moving a crop material rearwardly, the auger having a centerline, a front end, and a rear end; and
stripping, by way of an auger stripper coupled with the end row divider, the crop material from the auger, the auger stripper being angularly disposed relative to the centerline and extending below the auger from the inboard side of the end row divider adjacent the front end to the outboard side of the end row divider.

12. The method of claim 11, the auger stripper being associated with the front end but not the rear end.

13. The method of claim 12, wherein the auger includes flighting, the auger stripper including a curved portion configured to form a constant clearance with the flighting when the auger rotates.

14. The method of claim 13, wherein the auger stripper includes a leading edge portion that cooperates with the end row divider for stripping the crop material.

15. The method of claim 14, wherein the auger stripper includes a substantially Z-shaped configuration.

* * * * *